(12) United States Patent
Platt

(10) Patent No.: US 7,633,177 B2
(45) Date of Patent: Dec. 15, 2009

(54) REDUCED FRICTION WIND TURBINE APPARATUS AND METHOD

(75) Inventor: Michael D. Platt, Yates City, IL (US)

(73) Assignee: Natural Forces, LLC, Edelstein, IL (US)

(*) Notice: Subject to any disclaimer, the term of this patent is extended or adjusted under 35 U.S.C. 154(b) by 337 days.

(21) Appl. No.: 11/747,531

(22) Filed: May 11, 2007

(65) Prior Publication Data

US 2007/0241567 A1 Oct. 18, 2007

Related U.S. Application Data

(63) Continuation-in-part of application No. 11/105,945, filed on Apr. 14, 2005, now Pat. No. 7,235,893.

(51) Int. Cl.
*F03D 3/04* (2006.01)
(52) U.S. Cl. ............... 290/54; 290/43; 290/55
(58) Field of Classification Search ............ 290/42, 290/43, 44, 52, 53, 54, 55
See application file for complete search history.

(56) References Cited

U.S. PATENT DOCUMENTS

| | | | |
|---|---|---|---|
| 1,233,232 A | 7/1917 | Heyroth | |
| 1,352,960 A | 9/1920 | Heyroth | |
| 4,015,911 A | 4/1977 | Darvishian | |
| 4,031,405 A | 6/1977 | Asperger | |
| 4,350,900 A | 9/1982 | Baughman | |
| 4,551,631 A * | 11/1985 | Trigilio | 290/55 |
| 4,589,970 A | 5/1986 | Ligtenberg et al. | |
| 4,720,640 A | 1/1988 | Anderson et al. | |
| 5,038,049 A | 8/1991 | Kato | |
| 5,044,878 A | 9/1991 | Wilhelm | |
| 5,083,899 A * | 1/1992 | Koch | 415/2.1 |
| 5,852,331 A | 12/1998 | Giorgini | |
| 6,147,415 A | 11/2000 | Fukada | |
| 6,158,953 A * | 12/2000 | Lamont | 415/4.4 |
| 6,160,336 A | 12/2000 | Baker, Jr. et al. | |
| 6,191,496 B1 | 2/2001 | Elder | |
| 6,215,199 B1 | 4/2001 | Lysenko et al. | |
| 6,224,338 B1 | 5/2001 | Christaldi | |
| 6,239,506 B1 | 5/2001 | Roskey | |
| 6,239,507 B1 | 5/2001 | Douthit | |
| 6,242,818 B1 | 6/2001 | Smedley | |
| 6,246,125 B1 | 6/2001 | Axtell | |
| 6,254,034 B1 | 7/2001 | Carpenter | |
| 6,270,308 B1 * | 8/2001 | Groppel | 415/4.3 |
| 6,285,090 B1 | 9/2001 | Brutsaert et al. | |
| 6,320,273 B1 | 11/2001 | Nemec | |
| 6,361,275 B1 | 3/2002 | Wobben | |
| 6,400,039 B1 | 6/2002 | Wobben | |

(Continued)

*Primary Examiner*—Nicholas Ponomarenko
(74) *Attorney, Agent, or Firm*—Robert C. Haldiman; Husch Blackwell Sanders LLP

(57) ABSTRACT

A fluid flow energy capture device for power generation has a rotor with a substantially vertical axis and a plurality of vanes. A mount for the rotor allows the rotor to rotate in response to fluid flow such as wind contacting the plurality of vanes, and the mount puts the rotor in rotationally driving communication with a generator. The rotor has an open center which allows fluid communication from spaces between the vanes to above the rotor. A plurality of guide surfaces define channels that bias fluid flow to be tangential to the rotor.

22 Claims, 12 Drawing Sheets

U.S. PATENT DOCUMENTS

| | | |
|---|---|---|
| 6,402,472 B1 | 6/2002 | Hogue et al. |
| 6,452,287 B1 | 9/2002 | Looker |
| 6,465,899 B2 | 10/2002 | Roberts |
| 6,476,513 B1 | 11/2002 | Gueorguiev |
| 6,481,957 B1 | 11/2002 | Brill |
| 6,514,043 B1 | 2/2003 | Rasmussen et al. |
| 6,518,680 B2 | 2/2003 | McDavid, Jr. |
| 6,538,340 B2 | 3/2003 | Elder |
| 6,548,913 B2 | 4/2003 | Jang |
| 6,622,483 B2 | 9/2003 | Denniss |
| 6,641,367 B1 | 11/2003 | Van der Klippe |
| 6,655,916 B2 | 12/2003 | Ramisa Navarro |
| 6,674,181 B2 | 1/2004 | Harbison |
| 6,676,122 B1 | 1/2004 | Wobben |
| 6,700,218 B2 | 3/2004 | Saiz |
| 6,710,468 B1 | 3/2004 | Marrero O'Shanahan |
| 6,713,893 B2 | 3/2004 | van der Horn |
| 6,726,439 B2 | 4/2004 | Mikhail et al. |
| 6,726,440 B2 | 4/2004 | Pollard |
| 6,734,576 B2 | 5/2004 | Pacheco |
| 6,749,393 B2 | 6/2004 | Sosonkina |
| 6,750,559 B2 | 6/2004 | Becker |
| 6,766,643 B2 | 7/2004 | Christensen |
| 6,779,966 B2 | 8/2004 | Smith, II |
| 6,784,566 B2 | 8/2004 | Thomas |
| 6,798,082 B1 | 9/2004 | Chen |
| 6,860,720 B2 * | 3/2005 | Nagy ..................... 415/208.1 |
| 6,868,646 B1 | 3/2005 | Perina |
| 6,910,867 B2 | 6/2005 | Corten |
| 6,926,491 B2 | 8/2005 | Migler |
| 6,952,058 B2 | 10/2005 | McCoin |
| 6,962,478 B2 | 11/2005 | Tsipvo |
| 6,967,413 B2 | 11/2005 | Atiya |
| 6,979,175 B2 | 12/2005 | Drake |
| 6,984,899 B1 * | 1/2006 | Rice ........................... 290/44 |
| 7,008,171 B1 | 3/2006 | Whitworth |
| 7,011,497 B2 | 3/2006 | Schmidt |
| 7,040,858 B2 | 5/2006 | Suzuki |
| 7,042,109 B2 | 5/2006 | Gabrys |
| 7,067,937 B2 | 6/2006 | Enish et al. |
| 7,081,690 B2 | 7/2006 | Coman |
| 7,098,552 B2 | 8/2006 | McCoin |
| 7,101,152 B2 | 9/2006 | Wobben |
| 7,105,941 B2 | 9/2006 | Hua |
| 7,118,338 B2 | 10/2006 | Moroz et al. |
| 7,126,236 B2 | 10/2006 | Harbourt et al. |
| 7,129,596 B2 | 10/2006 | Macedo |
| 7,157,805 B2 | 1/2007 | Mooring |
| 7,161,260 B2 | 1/2007 | Kruger-Gotzmann et al. |
| 7,168,251 B1 | 1/2007 | Janssen |
| 7,172,386 B2 | 2/2007 | Truong et al. |
| 7,183,664 B2 | 2/2007 | McClintic |
| 7,186,083 B2 | 3/2007 | Bayly |
| 7,189,051 B1 | 3/2007 | Heifets |
| 7,190,087 B2 | 3/2007 | Williams |
| 7,235,893 B2 * | 6/2007 | Platt ........................... 290/54 |
| 7,348,686 B2 | 3/2008 | Fielder |
| 7,397,144 B1 * | 7/2008 | Brostmeyer et al. ........... 290/53 |
| 7,417,334 B2 | 8/2008 | Uchiyama |
| 7,425,772 B2 | 9/2008 | Novo Vidal |

* cited by examiner

REDUCED FRICTION WIND TURBINE APPARATUS AND METHOD

CROSS-REFERENCE TO RELATED APPLICATIONS

The present application is a Continuation-in-Part of application Ser. No. 11/105,945 filed on Apr. 14, 2005 now U.S. Pat. No. 7,235,893.

BACKGROUND OF THE INVENTION

1. Field of the Invention

The present invention is in the field of wind driven electricity generation.

2. Related Art

Wind as an alternate motive force for generating electricity has long provided an attractive alternative to conventional power generation techniques. The art has been limited by at least two technical difficulties. One is the inconsistency of the wind. Stated alternatively, there is a need in the art for extending the ability of wind driven electricity generation equipment to generate electricity beyond the time when the wind has dropped below velocities sufficient to turn generators. A corollary to this problem is overcoming the frictional resistance to supporting equipment that is large and massive enough to drive larger generating turbines.

Both of the long standing needs have a common denominator; that is the increased friction resistance inherent in using larger equipment capable of driving larger generators and also inherent with incorporating fly wheels for extended generation times. There is a need in the art for a wind driven electricity generating turbine having reduced friction support for its moving parts.

Separately, there is a need for a wind driven electricity generator that is not so structurally high, obtrusive and having such long blades that it interferes with bird life. Present windmills have long arms stationed atop towers that are tall enough to encroach upon the flight paths of birds and consequentially kill a number of them.

Vertical axle wind power generators have always been limited in their size (diameter) due to the forces of gravity.

Vertical axle generators are typically mounted on bearings which are required to bear the total weight of the device. The larger the device, the greater its weight and thus, the greater the bearing load.

Gravity also causes structural sag away from the axle. Therefore, heavier construction methods are required to maintain rigidity as diameters increase, thereby increasing weight loads on the bearing. These factors have limited the size (diameter) of vertical axle wind power generators and have therefore, limited the potential power output of these devices.

Performance is also affected by how a fluid medium such as air is vented, exhausted or outlet from a machine designed to extract energy from the flow of the fluid (wind). Qualitatively stated, the process of extracting energy from an input fluid velocity reduces that velocity. The presence of slow or still fluid at the outlet of the machine impedes the intake of further fluid by the machine, having a braking effect that decreases performance. For some configurations such as turbines, this effect is quantitatively understood as Betz's law. Some prior art devices have used scoops or funnels to advantageously direct fluid intake towards a rotor or other moving apparatus to extract energy from the fluid flow, see for example, U.S. Pat. No. 6,465,899 to Roberts, or U.S. Pat. No. 4,350,900 to Baughman, or U.S. Pat. No. 5,852,331 to Giorgini. Each of these devices suffers from a restricted and inadequate provision for the outlet or venting of the fluid medium (air) away from the energy extraction component (a rotor). There is a need in the art for a device for extracting energy from a fluid flow having intake guide surfaces that also has improved provisions for fluid outlet.

There is a continuing need in the electricity generating art for increasing efficiency, durability, increasing the amount of power generated from a given wind velocity and increasing economy such that electricity may be generated at a reduced cost.

SUMMARY OF THE INVENTION

The present invention is a wind driven apparatus engaging one or more electrical generators for generating electricity. The wind driven component is maintained in frictionless suspension by floating it on a pool of water. The invention may further comprise a flywheel in order to continue mechanical turning of generators after wind speed sufficient to turn the fan is no longer available.

The invention may further comprise a cowling for cutting wind resistance on a drag side of a fan. The cowling may further incorporate a wind vane and a rotational mounting so that the cowling always presents an open face of a fan to the windward direction and also continually shields the drag face of the fan from the wind to reduce drag.

Rigid Floating Hull

In another embodiment, a rotating, round, rigid hull supports the vane assembly. A center axle through the hull maintains the position of the hull. The hull is situated in a pool of fluid (water). Air may be pumped into an air-tight compartment under the hull. Air pressure supports the hull above the fluid, keeping the bottom of the hull out of contact with the fluid. The only part of the hull in contact with the fluid are a series of rings that are fixed to the underside and to the outside edge of the hull. These rings extend into the fluid creating pressurized air-tight compartments.

This configuration reduces downward forces on the axle bearings. It reduces structural sagging away from the axle and provides a rigid superstructure to carry the vane assembly. It reduces potential drag forces between the rotating hull and the pool of fluid beneath it. The weight of the rotating hull gives the device kinetic energy and rotational stability.

The Fixed Center Axle

A fixed center axle extends from a point above the height of the vane assembly, through the hull, through the fluid pool, through the power house located under the fluid pool and into the ground. Anchored in the ground below the power house and braced by cables at its upper end, this fixed center axle serves as the structural member which the hull and its vane assembly rotate around.

Outer Sleeve, Spokes, Shutter Ring and Vane Assembly

An outer sleeve fits over the fixed center axle. This outer sleeve rotates around the fixed center axle. Spokes attached to the outer sleeve are attached to a series of supports (upper, lower and middle) that support the ring of vanes which are situated on top of and at the outer edge of the hull. In the disclosed embodiment, the supports are toroids. The lower vane support is fixed to the upper surface of the hull. The hull, vanes and supports rotate in unison as a single device.

The angle of the vanes in relation to the fixed center axle can be adjusted by a circular shutter ring attached to each vane. Moving the shutter ring to clockwise or counterclockwise causes the vanes to open and close in unison. These vertical vanes rising parallel to the axle from the lower support to the upper support may be flat, curved, bi-facial, lenticular or an air foil.

In addition to the vertical vanes an array of horizontal vanes perpendicular to the axle is situated inside the diameter of the vertical vane ring. These horizontal vanes are angled in relation to the axle, as would be a fan or a propeller. A circular shutter ring attached to each vane would be used to simultaneously change the angle of these horizontal vanes in relation to the axle. These horizontal vanes may also be flat, curved, bi-facial, lenticular or an air foil. These horizontal vanes may or may not fully extend from the outer sleeve to the inside edge of the vertical vane array. In the depicted embodiments the horizontal vanes are near the top of the vertical vane assembly. Thus, wind drives the vertical vanes upon entering the device, and drives the device again upon exiting it through the horizontal vanes.

This configuration allows for the vertical and horizontal vane assemblies to be very strong and capable of withstanding very high wind load forces. It allows the device to capture energy as the wind passes over both the vertical vanes and then the horizontal vanes before exiting the device.

Ram Air Induction Shroud, Pressure Relief Doors, Inner Guide Walls and Movable Flaps The depicted ram air induction shroud is a fixed circular roof structure that extends outward from the outer edge of the upper support. This fixed roof structure angles upward so that the outer edge of the roof is a higher elevation than where the roof meets the upper support. This causes the roof to compress a larger volume of air (wind) into the vane assemblies.

The pool of fluid that supports the hull may be situated on an elevated earthen mound. The earth slopes downward, away from the pool. This angle may be roughly the same angle as the roof rises away from the upper support ring of the rotor. If, for instance, the elevation rise in the roof and the fall of the downward slope away from the elevated pool are both equal to the vertical vane height, then the amount of air delivered into the vane assembly is increased by a factor of three.

Pressure relief doors may be situated on the roof. These doors allow high pressure wind loads that may damage the device to be vented out of the roof. These doors may be operated by a mechanical, electric or hydraulic means.

Fixed inner guide walls are situated between the roof and the ground. These equally spaced inner guide walls are angled relative to a radius of the center axle. These inner guide walls convert uniform wind loads into angular wind loads that are more tangential to the vane ring, and therefore more perpendicular to the surface of each vane, providing more force. These inner guide walls also shield the rotating device from drag forces on the non-driven side of the vane ring.

A movable flap extends from the inside edge of each inner guide wall towards the outer edge of the vertical vane assembly. The position of this movable flap can be controlled by mechanical, electric or hydraulic means.

Air Raceway

These movable flaps create an air raceway located adjacent to the outer edge of the vertical vane assembly.

As wind forces load into the ram air induction shroud, air pressure increases as wind moves inward from the outer edge of the shroud towards the vertical vane assembly. As pressurized wind loads increase, these movable flaps automatically open in sequence, thus creating an arced air raceway adjacent to the vertical vanes. This arced air raceway contains, directs and requires all the pressurized wind loaded by the ram air induction shroud to pass through the vertical vanes in order to exit the device.

The air raceway enables the vanes to accept wind loads at a constant, consistent and more perpendicular angle of attack. The air raceway allows the vanes to accept wind loads along a continuous arc of variable length that is determined by wind speeds loading into the ram air induction shroud.

At higher wind speeds, it will be possible to load more than 180 degrees of the circular vane assembly. Using the movable flaps to control the length and width of the raceway allows the operator to precisely control air flow rates across the vanes at every point around the circumference of the rotating assembly. This allows the operator to maximize wind energy recovery and to reduce drag forces.

Wind Deflection Towers

An array of movable wind deflection towers that may articulate in unison may be located outside the ram air induction shroud. These movable towers are designed to control air delivery into the ram air induction shroud. A set of towers extends in a line away from the shroud at outer edge of each inner guide wall.

These adjustable towers are used to load more wind into the shroud, to redirect wind movement before it reaches the inner guide wall and to reduce the drag forces that may be produced by wind moving past the entire device.

Water Injection System, Evaporation Pond and Updraft System

A water injection systems sprays water droplets into the space between the inner guide walls and into the air raceway. Wind movement in the raceway accelerates these water droplets that are then delivered into the vertical vanes. This tends to increase the mass carried by the wind into a moving liquid that is more efficient at transferring its power upon impact into a vane. This increase the overall efficiency of the entire device.

An evaporation pond surrounds the ram air induction shroud. The purpose is to humidify the air entering the ram air induction shroud, making it heavier and therefore more powerful.

The entire center of the device inside the ring of vertical vanes is painted black and is designed to accumulate heat from the sun, creating an updraft system. As the center of the device heats up it causes air above it to rise, allowing more air to pass through the vanes and exit more quickly out of the device.

Power House

The power house is situated under the fluid pool. The outer sleeve passes through the ceiling of the power house and continues into the floor where it is contained between the fixed axle on the inside and a floor race on the outside.

In one embodiment, a belt driven by the rotating outer sleeve powers a single or multiple electric generators. As wind speeds increase, more generator power may be applied to the rotor. This increasing draw of power by the generators may be used to selectively brake the rotational speed of the wind driven assembly as may be necessary.

This configuration allows the device to generate the maximum power achievable under any given wind speed. Placing the power house under the fluid pool eliminates surface structures that may interfere with wind flow into the shroud.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
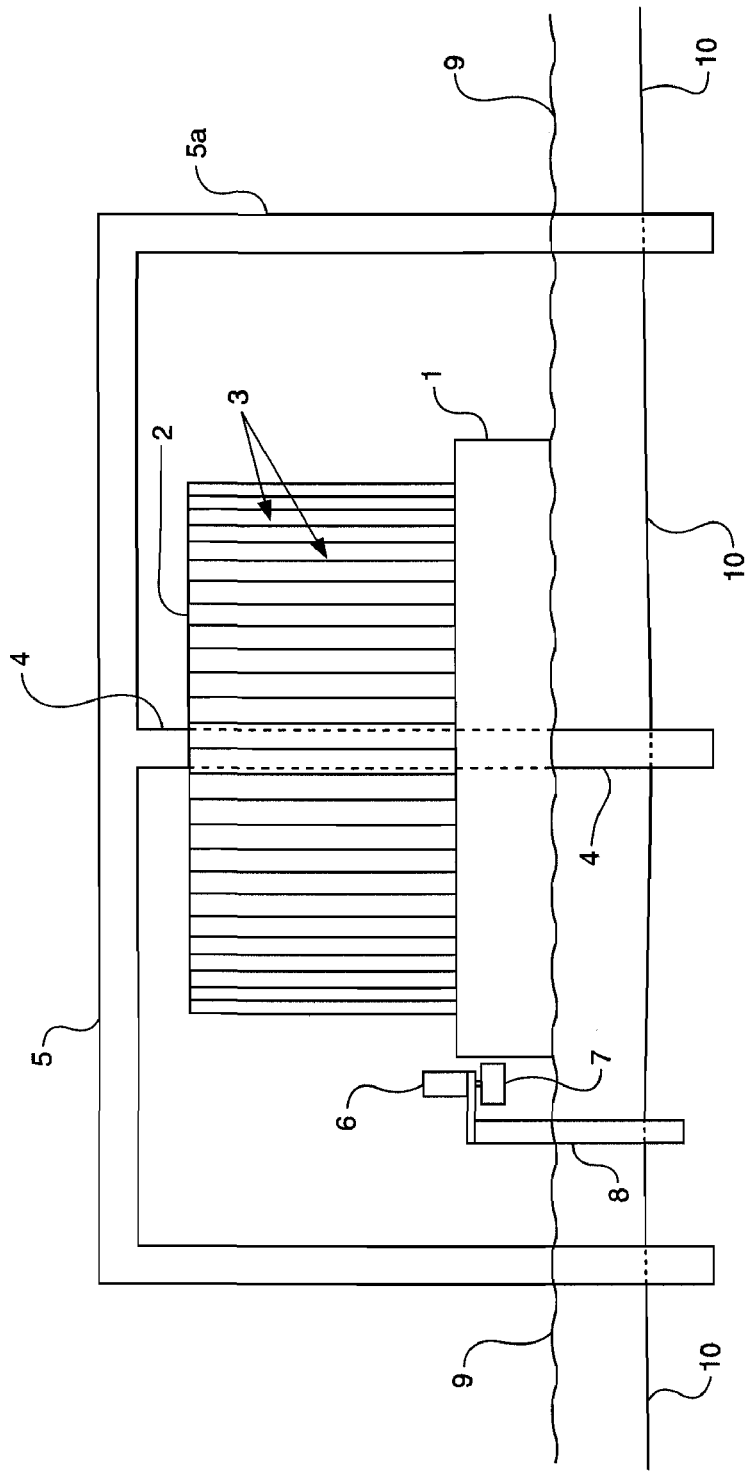
FIG. 1 is a side view of the wind driven fan and electric generator of the present invention.
Figure 2:
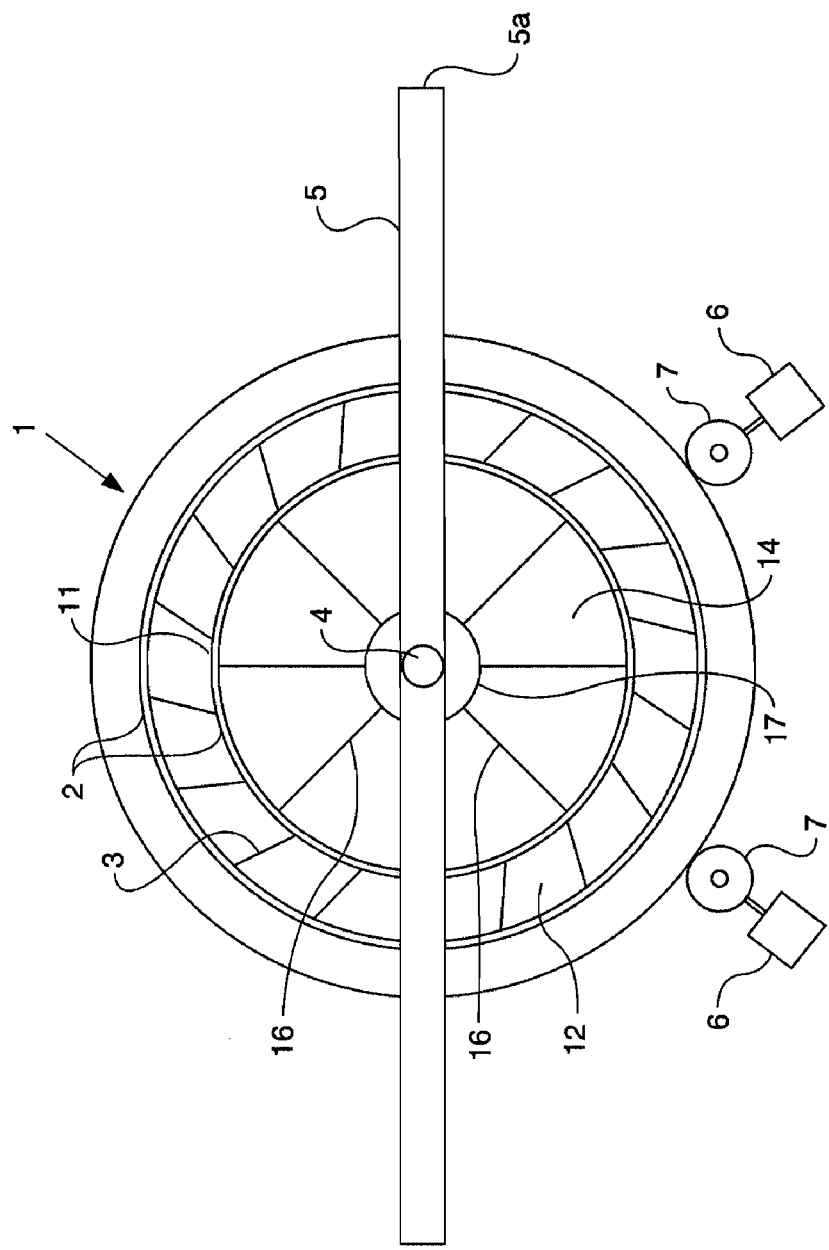
FIG. 2 is a top view of the wind driven fan and electric generator of the present invention.

As illustrated in the drawings where like numerals represent like elements, FIGS. 1 and 2 depict the first embodiment of the present invention. A floating hull 1 is disposed to rest on a body of water 9. The body of water may be a preexisting naturally formed body water. Alternatively, the body of water 9 may be an artificially created pond, lagoon or the like disposed for support of the wind driven electricity generator.

Hull 1 has a positive displacement so that it floats on water. Hull 1 may be any size and weight, subject only to the limitation that it floats. Accordingly, hull 1 may be heavy and massive enough to serve as a flywheel. In the depicted embodiment, hull 1 is circular.

Hull 1 serves as a bottom mount for a plurality of vanes 3. The vanes are circularly arranged to form a fan. The type of fan 3 depicted is sometimes referred to in the art as "squirrel cage." The top of the vanes 3 are secured by an inner annular frame 2 and an outer annular frame 2 as is apparent on FIG. 2, the vanes 3 are disposed at an angle to the radius of the circular squirrel cage. They may thereby catch the wind and propel the fan angularly. The vanes may be any angle and any spacing. The structural integrity of the squirrel cage is further supported by spokes 16.

The squirrel cage 3 and hull 1 are mounted on a frame 5. The frame 5 has descending substantially vertical lateral portions 5A for mounting in the ground or other fixed surface. From the cross member of frame 5 descends a substantially vertical axle 4. Axle 4 is secured to frame 5 by a bearing. Axle 4 is mounted in the ground having a mount that may also include a bearing.

Located on one side of the hull 1 is a support frame or rod 8. At the top of the support frame or rod is an electrical generator 6. The electrical generator 6 may have an axle extending therefrom on which is placed a frictional contact roller 7. The post 8, generator 6 and drive roller 7 are disposed such that the driver roller 7 may be in contact with the outer circular edge of hull 1. As seen in FIG. 2, there may be multiple generators.

In operation, wind contacts the plurality of vanes of 3 and drives the squirrel cage rotationally around vertical axle 4. The rotating squirrel cage turns the circular hull 1 and, through frictional engagement, turns the contacting drive wheels 7. The drive wheel 7 turn the armature of the generator 6, thereby generating electricity through known methods. Generated electricity may be conveyed away from the device via wires (not shown). Multiple generators may be driven.

In an alternative embodiment of the present invention, vertical axle 4 may be mounted on its top bearing and its bottom mount with some "play" therein. Such a mounting would allow absorption of gusts of wind without creating frictional drag on the rotation of the squirrel cage and hull. In order to do so the mounting and generator 6 on post 8 would have a flexing mechanism or spring in order to hold drive wheel 7 in contact with the outer circular edge of hull 1.

Figure 3:
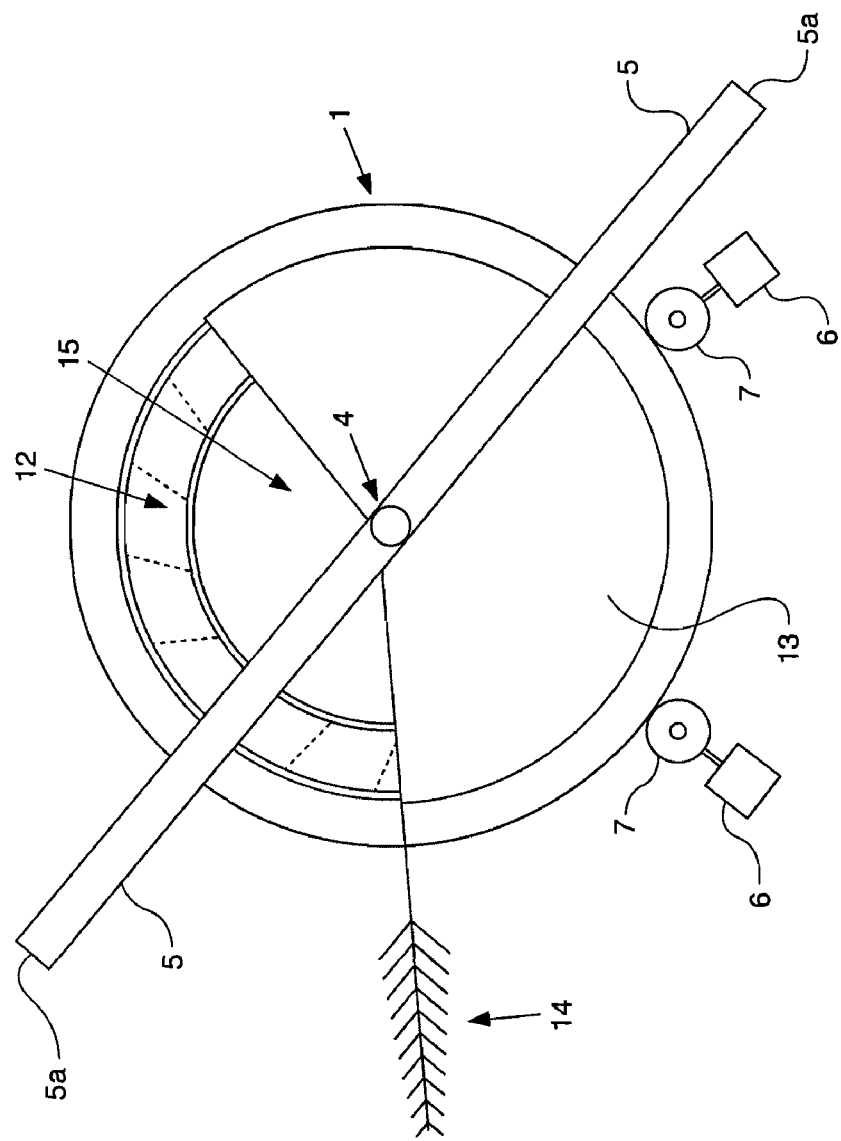
FIG. 3 is a top view of the wind driven fan and electric generator of the present invention with cowling and wind vane attached.
Figure 4:
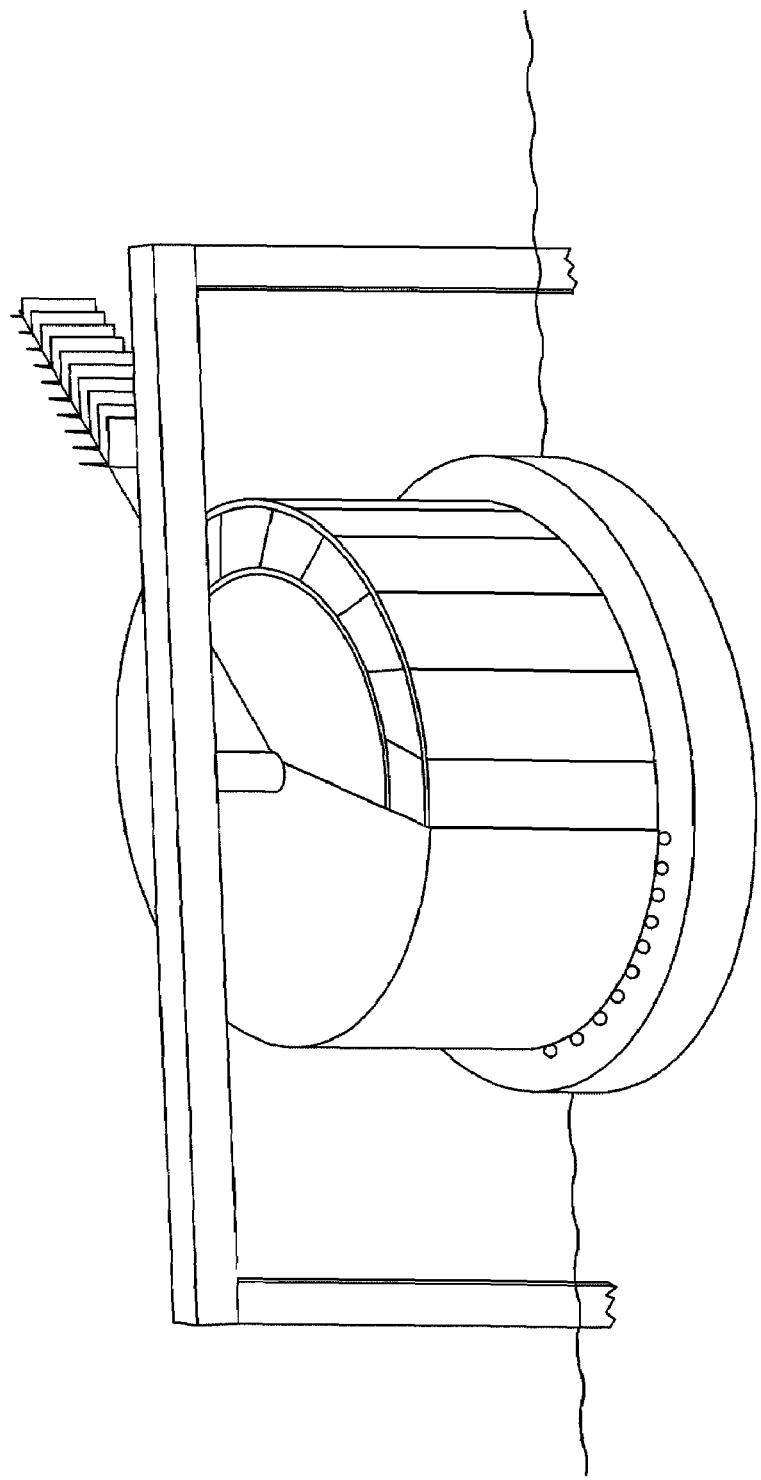
FIG. 4 is a perspective view of the wind driven fan and electric generator of the present invention with cowing and wind vane attached.

In FIGS. 3 and 4 are depicted another alternative embodiment of the present invention. This embodiment includes a cowling 13 and wind vane 14. The cowling 13 presents a face to the wind that reduces drag on the side of the squirrel cage opposite the wind driven side. Accordingly, there is a positive balance of forces for the continuing drive of the squirrel cage by the wind, for an increased amount of angular rotation in a constant wind and for adequate driven angular rotation in lower wind speeds.

Wind vane 14 serves to properly and consistently orient the cowling towards the wind. As can be seen, the angular section of the squirrel cage having the maximum capacity to transfer driving wind to angular momentum is kept exposed to the wind through the opening in the cowling. Concomitantly, the opposing half of the squirrel cage, which would create a drag on the conversion of wind to angular momentum, is shielded to reduce drag on it. The cowling 13 is mounted on vertical axle 4 with another bearing at its top. The cowling 13 may also be provided with bottom rollers or other types of bearings and may alternatively engage a groove or other reduced friction surface on the top of hull 1 such that it may turn freely.

FIGS. 5 through 11 depict an alternative embodiment of the present invention, incorporating multiple points of novelty.

Figure 5:
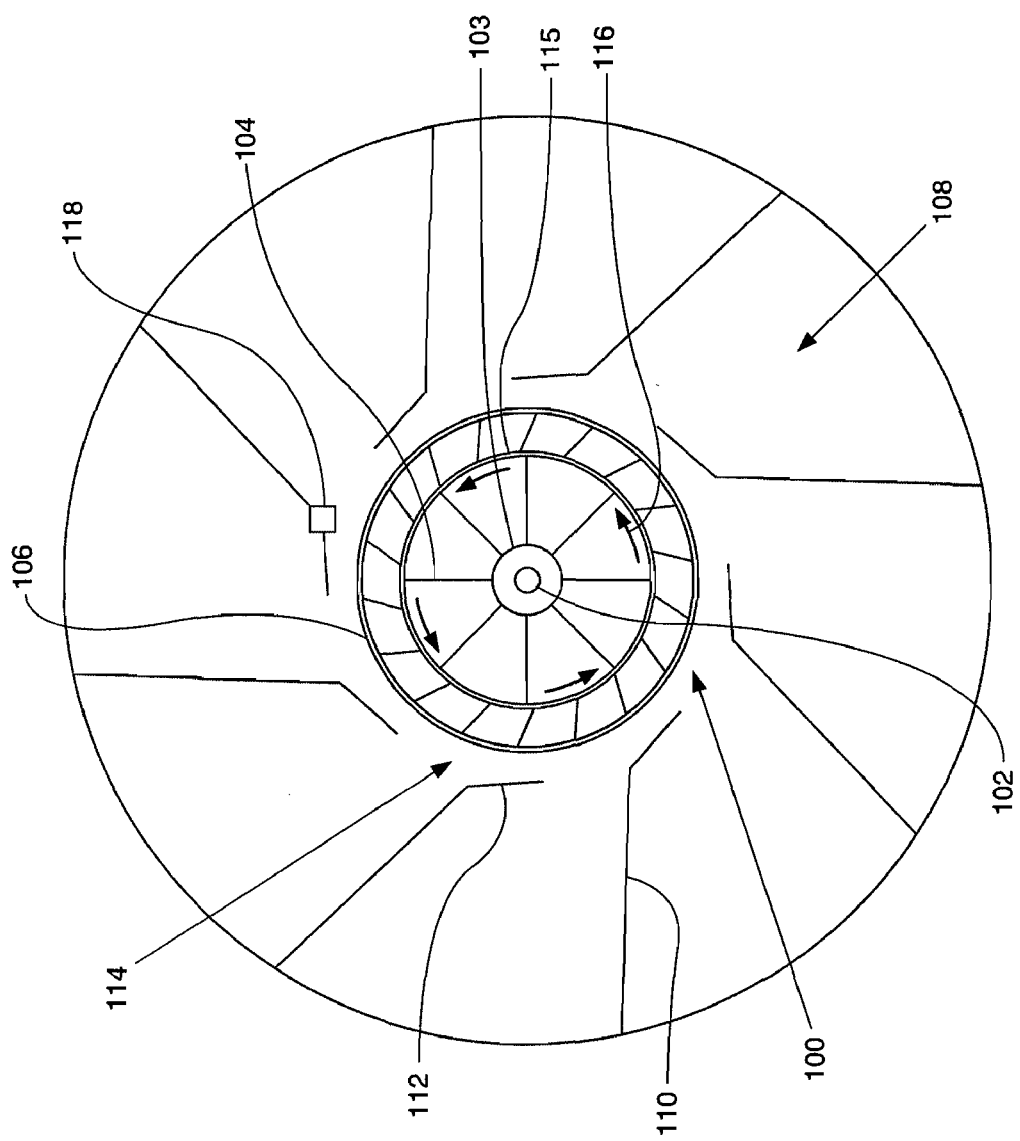
FIG. 5 is a cutaway top view showing the fixed inner guide walls, movable flaps, on air raceway that are under a roof.

FIG. 5 is a top view of an energy extracting rotor assembly 100. This rotor assembly is comprised of a vertical axle 102 which may be comprised of a fixed central axle surrounded by a rotating sheath 103. A plurality of struts 104 supports an upper and lower annular support 106 which between them support a plurality of vanes 116. Fluid flow such as wind flowing over the vanes causes the rotor 100 to spin in the direction indicated, thereby causing axle 102 or a sheath 103 around a fixed axle to rotate providing a mechanism for turning a generator. The pitch of the vanes may be adjusted with a shutter ring 115.

The rotor 100 is surrounded by a plurality of guide surfaces 110. In the depicted embodiment the guide surfaces are arranged annularly around the rotor and evenly spaced, thereby creating between them channels 108 for receiving fluid flow (wind) from any direction and channeling it to an advantageous rotational, cyclonic or venturi pathway along an air raceway 114. The guide surfaces will also support a top or roof of the apparatus, In the depicted embodiment, each guide surface has an inner aspect 112 that may be angled differently than an outer aspect of the guide surface. The inner aspect 112 of the guide surface may be fixed, or may be mounted in such a way, as for example by a pivot, so that its angle relative to the outer aspect of the guide surface and to the rotor may be moved selectively. For such movement an actuator 118 may be mounted with the inner aspect of the guide surface to effect movement by any means, as for example hydraulic, electric or mechanical. In the depicted embodiment, the inner aspect 112 may advantageously be moved between angles that are more or less tangential to the circular outer extent of the rotor 100. This angle increases the change in direction of incoming fluid flow towards a more advantageous cyclonic, circular or rotational pathway. Raceway 114 may also be varied in width to promote an optimal fluid cooperation between the innermost extent of the inner aspect 112 of the guide surfaces and the vanes 116 of the rotor 100, in order to maximize wind speed at the rotor and power extraction from the fluid flow by the vanes 116. In those embodiments where the inner aspect is movable, individual guide surfaces may be moved in unison or each may be moved a different amount. Hence, the outer aspects of the guide surfaces receive fluid flow (wind) from any direction, and in combination with the inner aspect urge the air towards the advantageous rotational air raceway. Additionally, those guide surfaces on the drag side of the rotor decrease drag and improve efficiency by shielding vanes that would impede the turning of the rotor if they were exposed to the wind.

Figure 10:
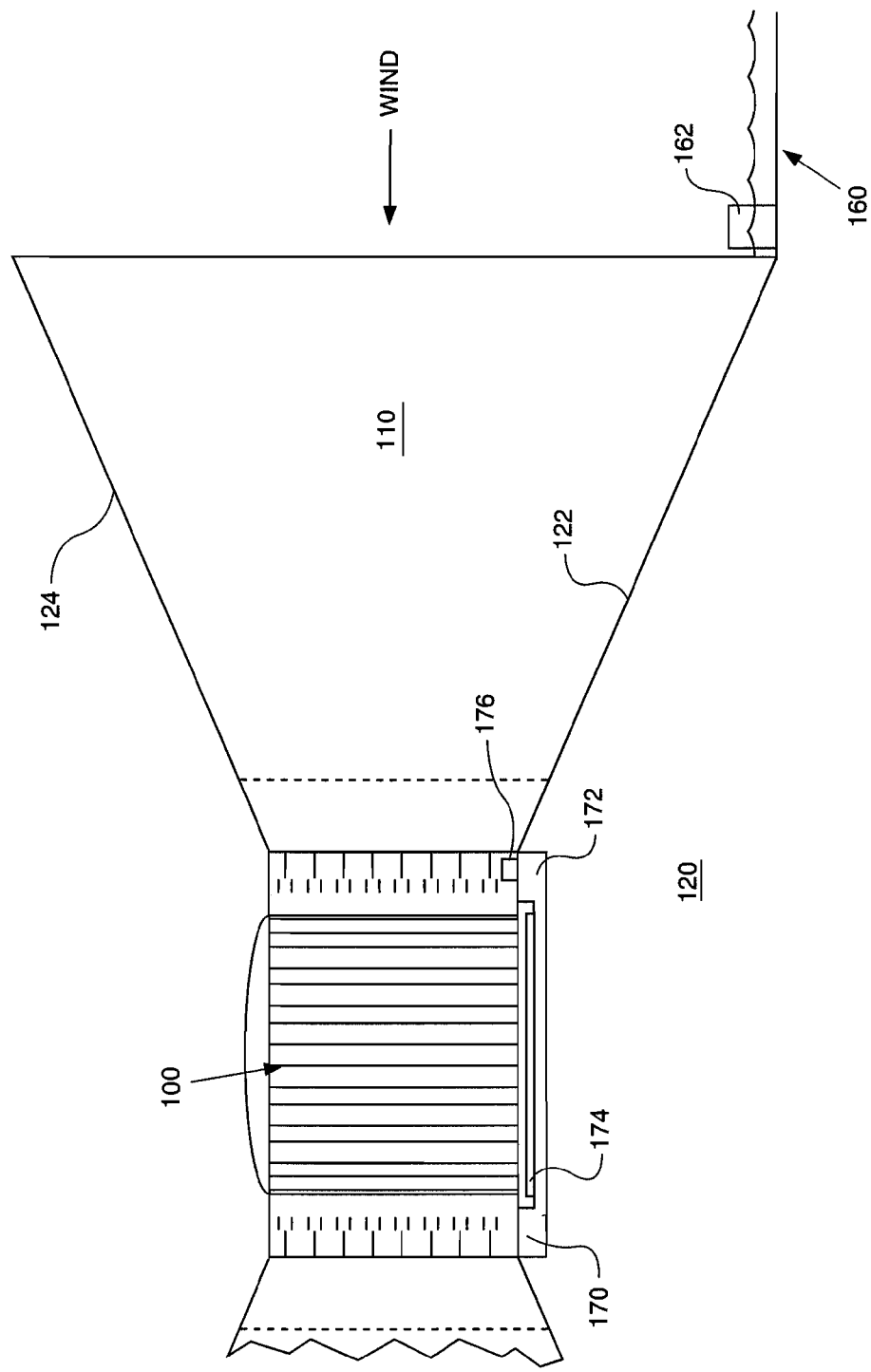
FIG. 10 is a side view showing vertical axle wind power generator vanes, air race way, moveable guide wall, fixed guide wall, roof, evaporation pond, water injection assembly.

FIG. 10 is a side view of the depicted embodiment showing upper and lower vertical extents of the guide surfaces 110. As can be seen the rotor 100 is mounted at the top of an elevation 120. In the depicted embodiment, the elevation may be created by an earthen mound. The guide surfaces 110 extend radially from the rotor 100 to a radius that is farther downhill than the furthest extent of the rotor. Hence, the upwards angle of the elevation 120 serves to compress incoming fluid flow along surface 122, thereby increasing fluid flow velocity and also increasing the amount of power and energy applied to the rotor by the incoming fluid flow.

Similarly, a top is provided for the channels 108 in the form of a roof or other air ram guiding surface 124. As depicted in FIG. 10, the guide surfaces 110 are taller at their outermost extent than they are at their innermost extent nearest the rotor 100. Hence the top surface 124 supported by the guide surfaces 110 also serves to compress and accelerate incoming fluid flow, having the same advantageous effect on velocity as the companion elevating surface 122. The top or roof 124 also serves as a mount for the rotor 100.

Figure 6:
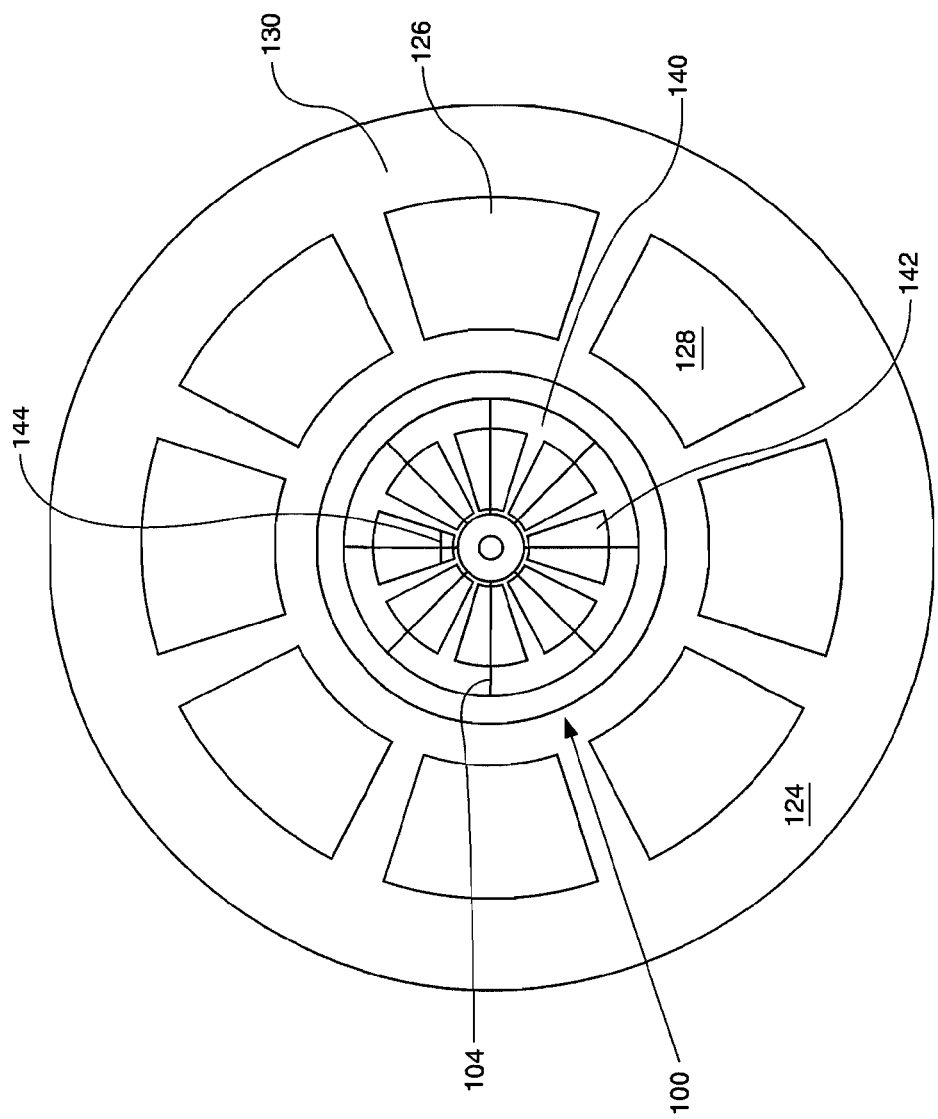
FIG. 6 is a top view showing a roof configured as a ram air induction shroud and vertical axle wind power generator

FIG. 6 is a top view of the apparatus with the solid top or roof 124 in place. In the depicted embodiment, each channel 108 is beneath a pressure release opening 126 provided in the roof 124. These openings have a lid 128 which is mechanically attached to the rest of the roof 124, as for example by a hinge 130. Depending on a condition such as wind speed, these pressure release openings 126 may be selectively opened to varying extents in order to optimize the efficiency of the energy extraction device. Also depicted in FIG. 6 are a plurality of horizontally deployed vanes 142. In the depicted embodiment, these are mounted on the struts 104.

As is evident from top views in FIGS. 5 and 6, the rotor 100 has no solid covering above it. Neither the roof 124, the struts 104, nor any other structure, entirely seals the inner area of the rotor. Hence, in the depicted embodiment an opening 140 is maintained in the top of a rotor or "squirrel cage." Some exhaust fluid flow will exit the rotor between the vanes on the leeward side of the device, and thereafter further exit the device through the leeward oriented channels 108. The ease and rapidity of fluid exhaust is supplemented in the depicted embodiment by the opening 140 in the top of the rotor. This serves to decrease resistance to the continuing entrance of more fluid flow on the windward side of the device, thus further ameliorating the effect of Betz's law. Additionally, the flow of the principle wind over the entire device may further serve to promote the exhaust of "dead air" from within the rotor according to Bernoulli's principle.

Vanes 142 are placed in opening 140 in order to further control and take advantage of the flow of air upwards out of the center of the rotor 100. Energy is captured from this flow by its flow over the vanes 142. The vanes are angled with respect to horizontal. The angle of the vanes is also selectively changeable according to actuators 144 which may also be for example electric, mechanical or hydraulic. Moreover, the overall surface area of the opening 140 may be advantageously manipulated by rotating the vanes 142 to be more flat and horizontal, thereby reducing the surface area of opening 140 or more steeply angled and vertical.

Figure 7:
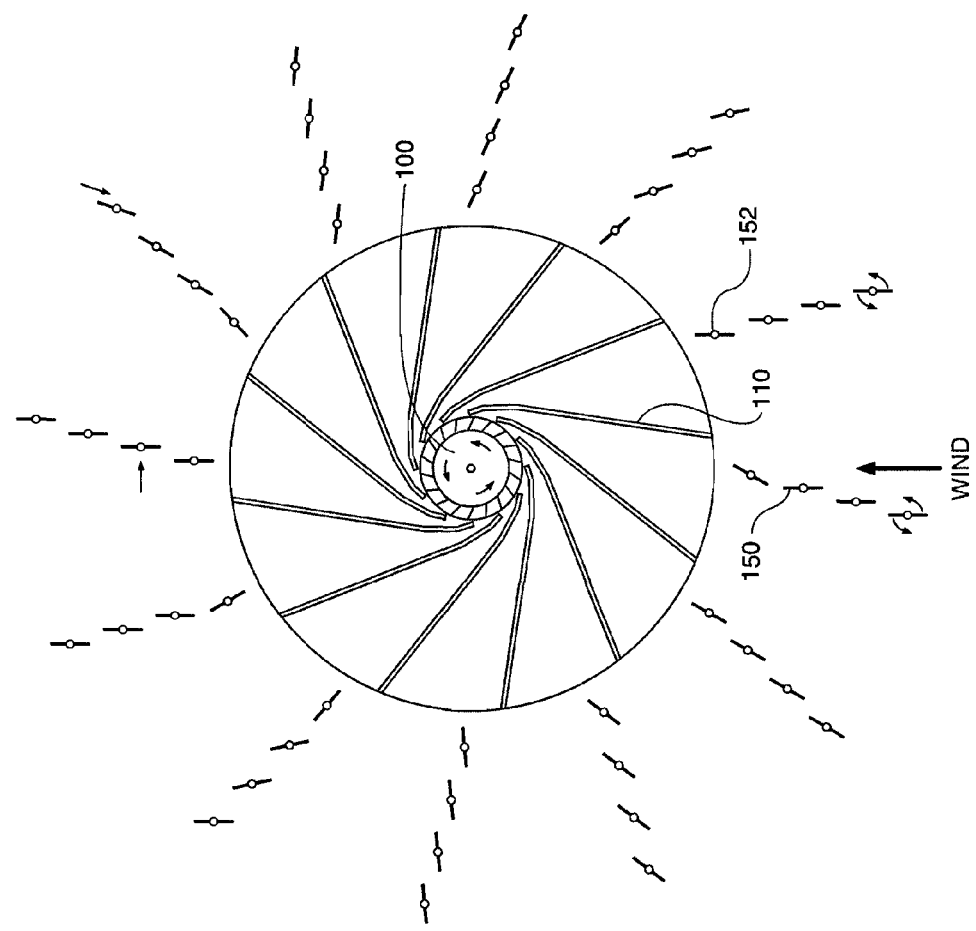
FIG. 7 is a top view showing an array of wind deflection towers

FIG. 7 is also a top view of the depicted embodiment of the present invention showing a greater radius for the overall assembly. Depicted in FIG. 7 are a plurality of directing panels 150.

Figure 8:
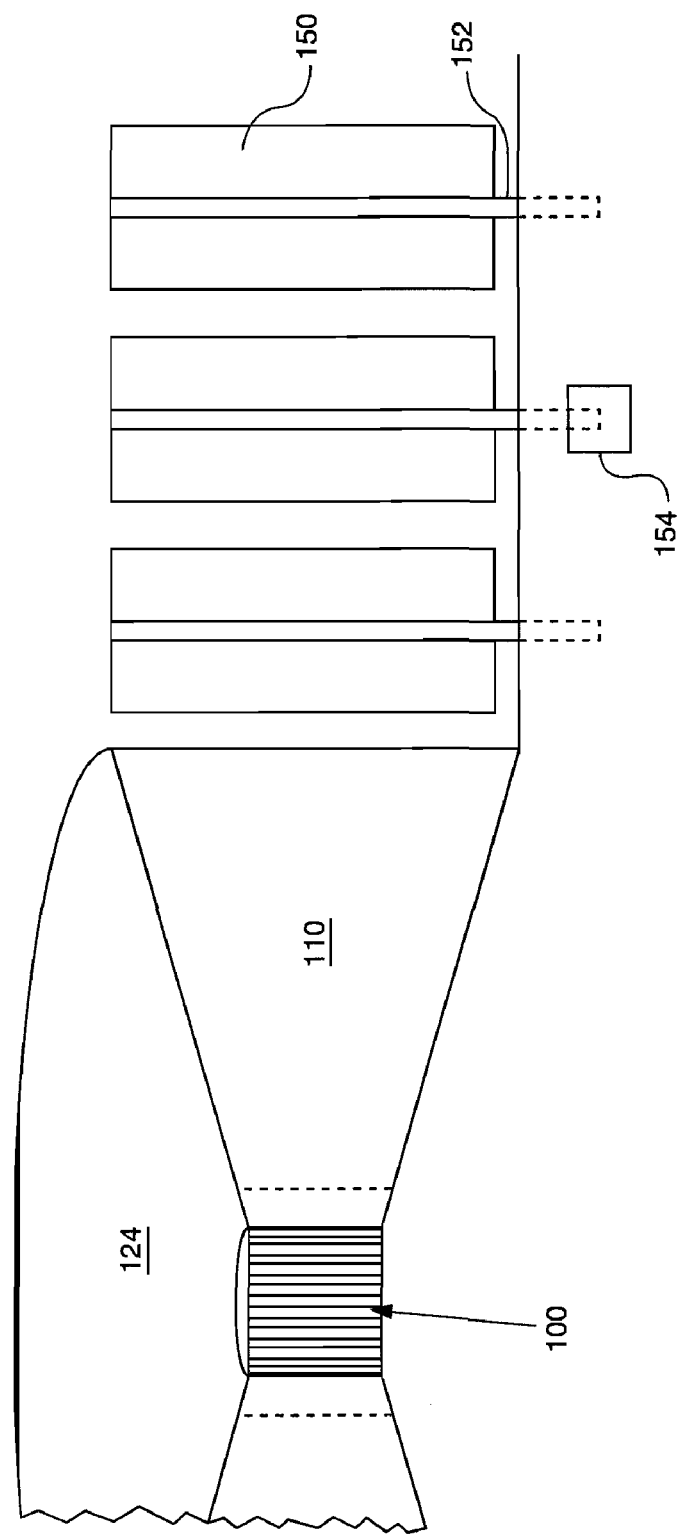
FIG. 8 is a side view showing an array of wind deflection towers ram air induction shroud roof, vertical axle wind power generator vanes situated on an earthen mound, air raceway and fixed guide wall.

FIG. 8 shows a side view of the directing panels 150. Each of the panels is mounted on a vertical post 152 and may be selectively rotated about the post 152. In the depicted embodiment, a plurality of directing panels 150 is associated with each guide surface 110. In the depicted embodiment, the plurality of directing panels posts 152 is substantially aligned with the outer aspect of the guide surfaces 110, having the effect of extending the guide surfaces and the channels between them. Directing panels 150 may be turned by actuators 154, which may be electric, mechanical or hydraulic, for example.

Figure 9:
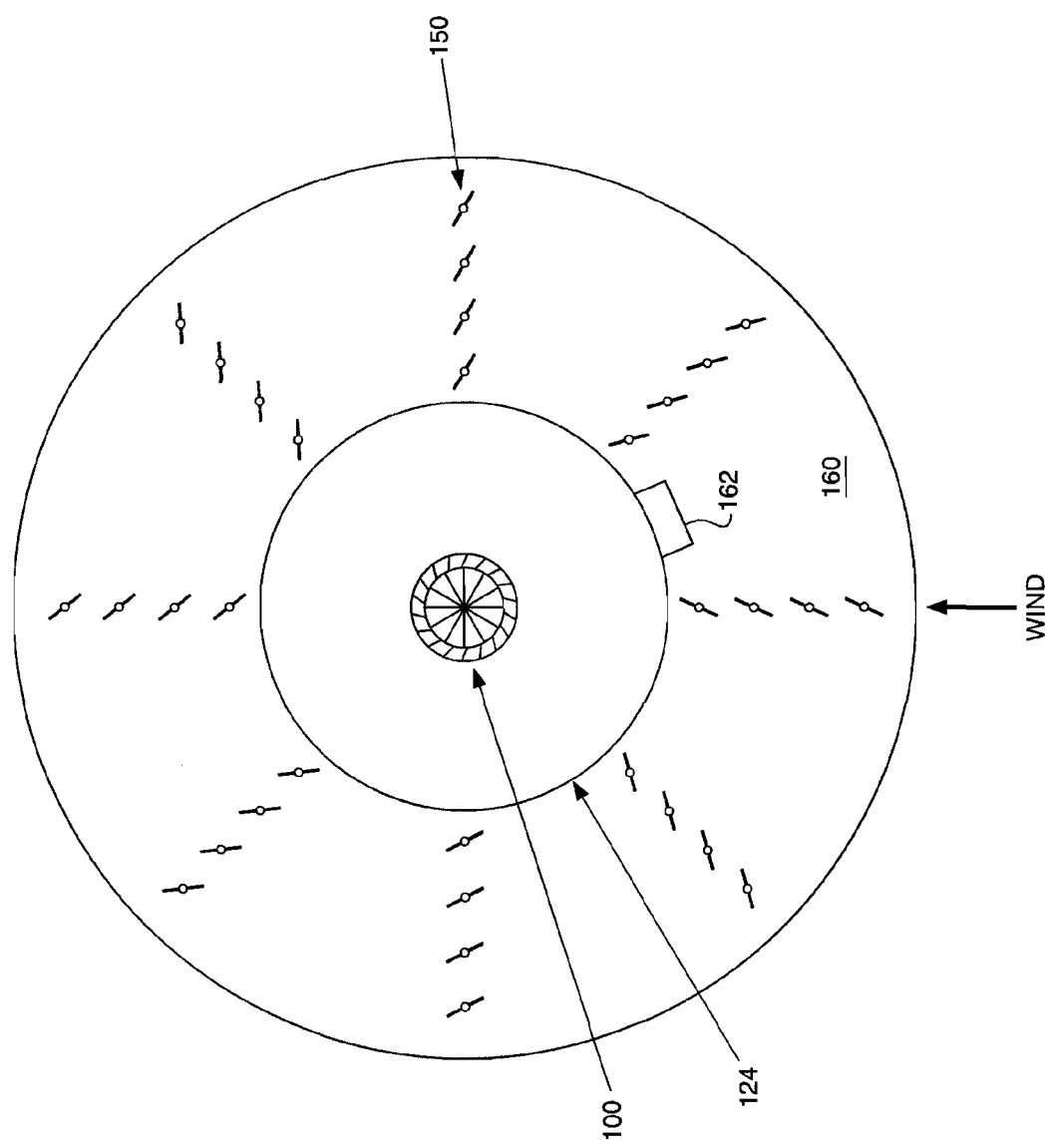
FIG. 9 is a top view showing rotating vertical axle wind power generator: vanes, axle and spokes ram air induction shroud roof, wind deflection towers evaporation pool.

FIG. 9, another top view showing the directing panels 150 also schematically represents an evaporation pond 160. The evaporation pond, and, optionally, sprayers which may be mounted anywhere relative to the channels and rotor of the present invention that are depicted schematically at 162 in FIGS. 9 and 10, serve to humidify the air and make it "heavier." The water particles, humidity or "heavy" air increases the mass of the fluid flow impacting the vanes, and by increasing the mass increase the power available for extraction by the rotor from the flow of fluid over it.

As depicted in the first alternate embodiment in FIGS. 1 through 4, the rotor is advantageously mounted on a hull 170, which is buoyant and floats on a body of water 172 constructed for the purpose of the top of the earthen mound 120. The buoyant hull 170 may also have a recess 174 underneath it for receiving a volume of pressurized air. This pressurized air will further increase the buoyancy of the hull and the overall rotor assembly mounted on it, thereby reducing the friction that retards free rotation of the rotor mounted on the floating hull. The hull also may be a location for mounting sprayers 176 or other devices for diverting fluid particles into the channels 108 for increasing the mass of the fluid flow over the vanes of the rotor.

Figure 11:
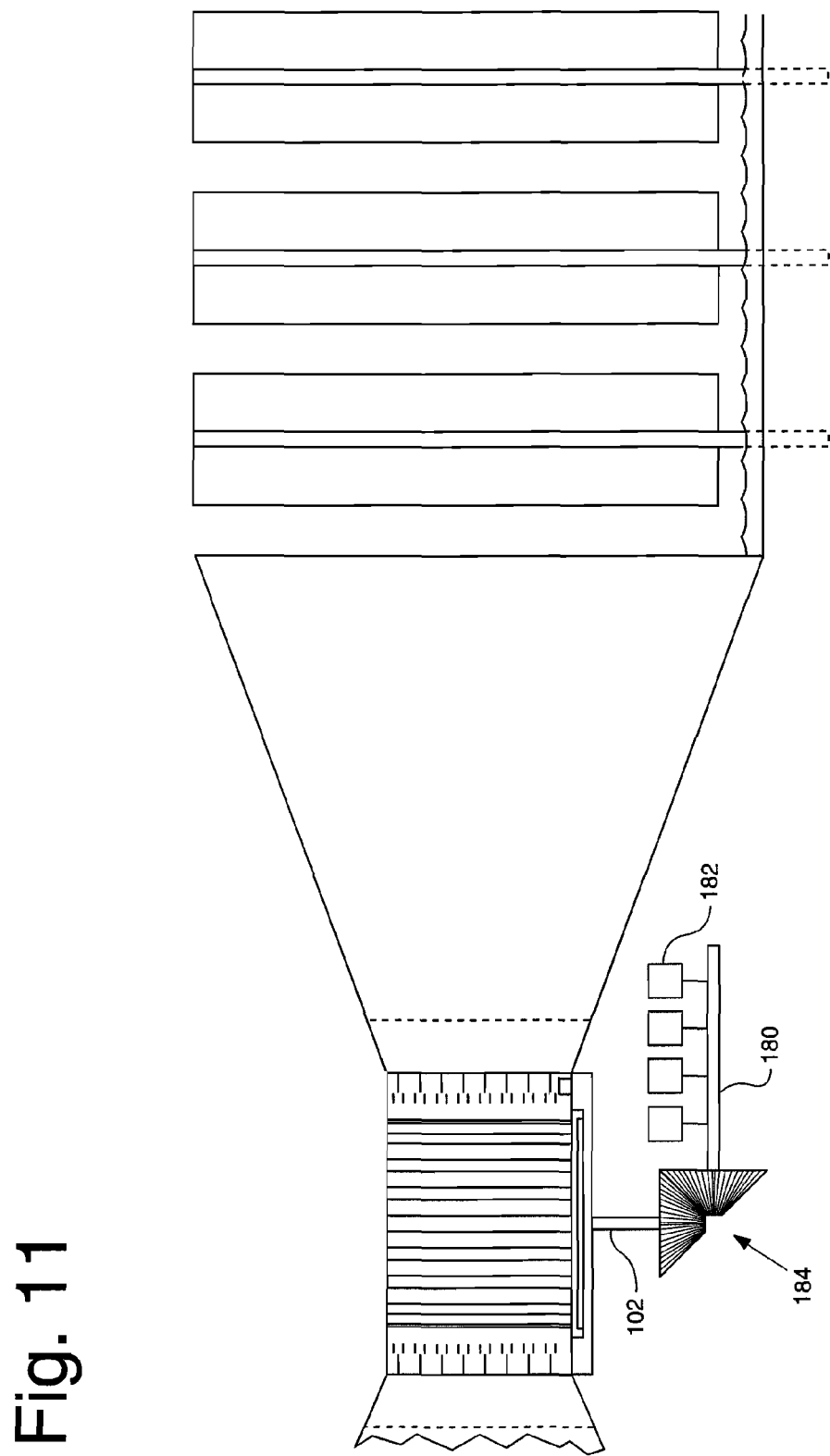
FIG. 11 is a side view showing axle, Vanes on rotating assembly roof, of ram air induction assembly fixed guide walls, movable guide walls, water injection, evaporation pond, wind deflector towers, drive gears, line shaft, and electric generator.

FIG. 11 is a cutaway side view of the device additionally showing the mechanical linkage of the spinning rotor to a number of generators. In the depicted embodiment, a fixed vertical axis is surrounded by a shaft 180 and thereafter connected through a series of gears 182 to a secondary shaft 184 or belt or other mechanical means thereby linking the rotational force with any of a plurality of generators 186.

Figure 12:
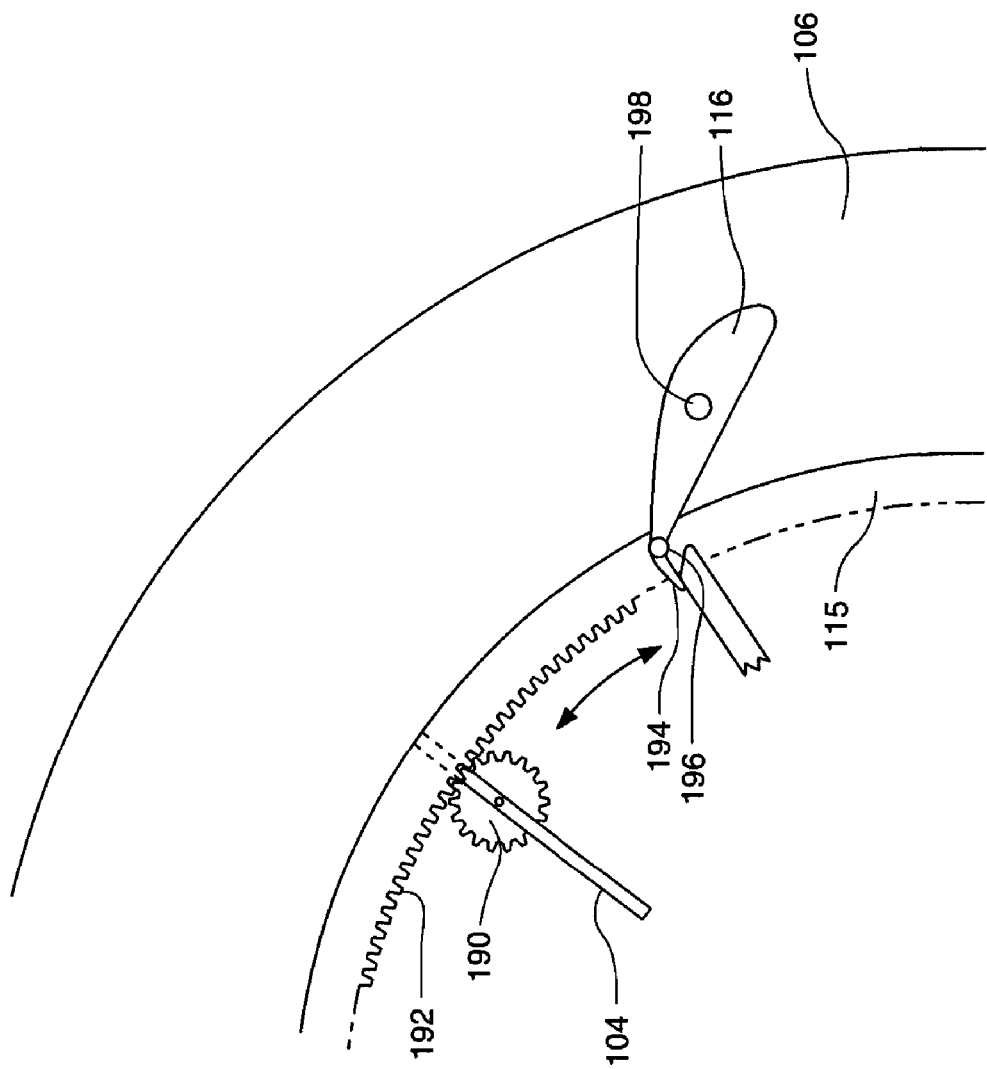
FIG. 12 is a close up view of the vane adjustment device.

FIG. 12 is a close up of the rotor vane adjustment device. In the depicted embodiment, support rings 106 support a plurality of vanes 116. The vanes may turn, as, in the depicted embodiment, on a vertically oriented pivot or axle 198. The inner aspect of each vane 116 may be connected to a shutter ring 115. In the depicted embodiment, this engagement may be by a post 196 that slides in a slot 194 in the shutter ring, wherein the slot is angled or arced to accommodate a circumferential travel of the end of the vane 116. Hence, turning the shutter ring 115 relative to the support ring 106 will pivot all the vanes 116 in order that they may open or shut, that is move towards an angle more parallel with a radius of the rotor, or more tangential to it. The center ring itself may be actuated in a variety of ways. In the depicted embodiment, a strut 104 serves as a mount for a gear or pinion 190 which may be turned by an electrical, mechanical servo motor or other actuator (omitted for clarity). In the depicted embodiment, pinion 190 engages through its teeth a rack 192 on the inner aspect of the shutter ring 115 in order to turn it relative to the support ring 106 and strut 104, thereby pivoting the vanes 116.

In operation, wind enters the ram air induction shroud. The roof of the ram air induction shroud angles upwards to contain and compress the wind. The fixed inner guide walls 110 under the roof direct this compressed air flow into the air raceway 114 that surrounds the rotating, vertical axle wind generator. The movable flaps 112 shape the width and the operational length of the air raceway. The compressed wind energy passes from the air raceway 114 across the vanes 116 to drive the rotating, vertical axle wind generator. The top of the vertical axle wind generator assembly is open 140 to allow the air to exit the rotating assembly after it passes over the vanes. The fixed guide walls 110 direct the wind into the air raceway 114, causing the air to address the vanes 116 at a continuous and steeper angle than would otherwise be provided around the outer circumference of the rotating assembly.

The fixed guide walls 110 shield the rotating assembly from drag forces on the non-driven side of the axle and converts that would-be wind drag into wind load on the rotating assembly.

The moveable flaps 112 located at the inside edge of the fixed inner guide walls 110, open and close depending on the direction from which the wind is blowing. This forces all the wind delivered into the ram air induction shroud to pass from the air raceway 114 over the vanes 116.

Pressure relief doors 126 allow air pressure inside the Ram air induction shroud to be discharged under control.

An array of wind deflection towers 150 surrounds the ram air induction shroud. Depending on the direction the wind is blowing, these wind deflection towers 150 rotate to direct more air into the ram air induction shroud. These wind deflection towers 150 are also used to manage wind vortices and reduce drag around the entire assembly.

Wind humidified by the evaporation pond 160 enters the device. Water injection assembly 162, 172 adds water vapor or water droplets or oil to the wind moving inside the air raceway. The wind accelerates this evaporated oil injected water which delivers its energy into the vane, delivering more power to the rotating assembly.

The axle extends through the bottom of the pool that holds the rotating assembly of vanes 116 whose superstructure is floating in a pool of water. Below this pool of water that supports the rotating assembly is the power house. The axle 102 transfers its power into a line shaft 108. A number of electric generators 182 are driven by the line shaft. In the depicted embodiment, the axle 102 engages the line shaft 182 via a gear box 184. As wind power loads increase, more generators are brought on-line to pull power from the rotating assembly.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A fluid flow energy capture device for power generation comprising:
   a rotor, said rotor being mounted to rotate around a substantially vertical axis and said rotor having a plurality of substantially vertical vanes and each of said vanes engaged with a vane actuator to adjust a pitch of said vanes;
   said rotor being disposed to be in driving communication with an electrical generator;
   a plurality of guide surfaces, said guide surfaces being disposed outside said vanes in relation to said rotor and each of said guide surfaces being engaged with a guide surface actuator to vary their positions;
   a plurality of deflection panels, said deflection panels being disposed outside said guide surfaces in relation to said rotor and each of said deflection panels being engaged with a deflection panel actuator to vary their positions;
   said guide surfaces and said deflection panels being further disposed to define inwardly constricting channels through which a fluid flow is directed to said vanes;
   at least one of said vanes, said guide surfaces or said deflection panels being mounted to vary in angle such that a driving force of the fluid flow onto said rotor may be selectively varied by one of said vanes actuators, said guide surfaces actuators and said deflection panels actuators.

2. The device of claim 1 further comprising at least one other of said vanes, said guide surfaces or said deflection panels being mounted to vary in angle.

3. The device of claim 1 further comprising all of said vanes, said guide surfaces of said deflection panels being mounted to vary in angle.

4. The device of claim 1 further comprising:
   a roof, said roof being above said guide surfaces;
   said roof having an exit opening over said rotor, said exit opening being positioned to allow an exit of fluid flow from a space inside said vanes of said rotor.

5. The device of claim 4 wherein said roof includes pressure release openings in said roof over said constricting channels.

6. The device of claim 5 wherein said pressure release openings have a lid, said lid being adjustably mounted to selectively vary a size of said pressure release opening.

7. The device of claim 1 further comprising:
   a plurality of top vanes positioned over said rotor.

8. The device of claim 7 wherein said top vanes are mounted to vary in angle such that exiting fluid flow between said top vanes may be selectively varied.

9. The device of claim 4 wherein an inner edge of said roof closely circumscribes a top of said rotor.

10. The device of claim 4 wherein said roof rises from a height substantially equal to a height of said rotor at said roof's inner edge, to a greater height in a position that is radially outward from said rotor.

11. The device of claim 1 wherein said fluid is air.

12. The device of claim 1 wherein an inner aspect of said guide surfaces is angled relative to an outer aspect of said guide surfaces.

13. The device of claim 12 wherein said angle of said outer aspect of said guide surfaces is more tangential to said rotor than an angle of said outer aspect of said guide surfaces.

14. The device of claim 1 wherein said guide surfaces are mounted on a ground surface that is radially inclined away from said rotor such that said ground surface, and each two adjacent ones of said plurality of guide surfaces define a channel for the fluid flow that is vertically constricting towards said rotor.

15. The device of claim 1 further comprising a water bearing supporting at least a portion of the weight of said rotor.

16. The device of claim 1 wherein said rotor is mounted on a buoyant hull and said buoyant hull is disposed in a fluid reservoir.

17. The device of claim 16 wherein said buoyant hull includes a space, said space being beneath said buoyant hull and above a surface of said fluid reservoir and said space being sealed sufficiently to maintain gas with said space at an atmospheric pressure greater than one atmosphere.

18. The device of claim 1 wherein said rotor includes a fixed axle holding a cylindrical sheath and wherein said rotor further comprises top and bottom annular supports, attached to said sheath by struts by struts and wherein said top and bottom annular supports hold said plurality of vanes.

19. The device of claim 1 wherein said vanes each have a cross section selected from the group consisting of straight, curved, rectangular and lenticular.

20. The device of claim 1 wherein said guide surfaces each have a cross section selected from the group consisting of straight, curved, rectangular and lenticular.

21. The device of claim 1 wherein said deflection panels each have a cross section selected from the group consisting of straight, curved, rectangular and lenticular.

22. The device of claim 1 further comprising a sprayer, said sprayer being disposed to disperse fluid particles in said channels.

* * * * *